US008828191B2

(12) United States Patent
Shaw

(10) Patent No.: US 8,828,191 B2
(45) Date of Patent: Sep. 9, 2014

(54) PROCESS AND APPARATUS FOR DECOMPOSITION OF POLYMER PRODUCTS INCLUDING THOSE CONTAINING SULPHUR SUCH AS VULCANISED RUBBER TYRES AND RECOVERY OF RESOURCES THEREFROM

(76) Inventor: Michael John Shaw, Belmont (AU)

( * ) Notice: Subject to any disclaimer, the term of this patent is extended or adjusted under 35 U.S.C. 154(b) by 613 days.

(21) Appl. No.: 13/119,725

(22) PCT Filed: Sep. 25, 2009

(86) PCT No.: PCT/AU2009/001283
§ 371 (c)(1),
(2), (4) Date: Mar. 18, 2011

(87) PCT Pub. No.: WO2010/034076
PCT Pub. Date: Apr. 1, 2010

(65) Prior Publication Data
US 2011/0171114 A1  Jul. 14, 2011

(30) Foreign Application Priority Data
Sep. 25, 2008  (AU) .............................. 2008904998

(51) Int. Cl.
C10G 9/08 (2006.01)
C10B 53/07 (2006.01)
C08J 11/12 (2006.01)
C10B 49/14 (2006.01)

(52) U.S. Cl.
CPC .............. *C08J 11/12* (2013.01); *C08J 2300/30* (2013.01); *C10B 53/07* (2013.01); *C08J 2319/00* (2013.01); *C10B 49/14* (2013.01); *C08J 2321/00* (2013.01)

USPC ........... 201/12; 201/3; 201/4; 201/10; 201/11; 201/28; 201/29; 422/198; 422/202; 422/239

(58) Field of Classification Search
USPC ............. 201/3–4, 10–12, 25, 28–29; 422/198, 422/202, 239
See application file for complete search history.

(56) References Cited

U.S. PATENT DOCUMENTS

| 2,858,255 | A  | * | 10/1958 | Bienvenido et al. ......... 202/219 |
| 3,974,206 | A  | * | 8/1976  | Tatsumi et al. .............. 560/216 |
| 3,996,022 | A  |   | 12/1976 | Larsen |
| 5,449,438 | A  | * | 9/1995  | Jagau et al. .................... 201/10 |
| 5,639,934 | A  | * | 6/1997  | Yamasaki et al. ............ 585/820 |
| 6,346,221 | B1 | * | 2/2002  | Wagner ..................... 422/184.1 |
| 2005/0131260 | A1 | | 6/2005 | Tokarz |

OTHER PUBLICATIONS

Toye et al. Physical Properties of Certain Liquid Binary Alloys of Tin and Zinc. Proceeding of the Physical Society 1958 vol. 71, No. 1 p. 88-99 England.

* cited by examiner

*Primary Examiner* — Brian McCaig

(57) ABSTRACT

A method and apparatus for pyrolytic destruction of polymer products including whole vehicle vulcanised rubber tires is disclosed. The apparatus 111 has a reaction chamber 153 into which a tire can be placed, and immersed for pyrolytic decomposition in a molten alloy of zinc with a minor proportion of aluminium. The apparatus 111 has a heated reservoir 155 in which the alloy is maintained in a molten state, and from where it can be transferred to the reaction chamber 153 to immerse the tire. Fluid hydrocarbon byproducts are drawn off for condensation and recovery, and solid zinc sulphides are also recovered. Where steel belted tires are processed, carbon and steel residues are also recovered.

20 Claims, 10 Drawing Sheets

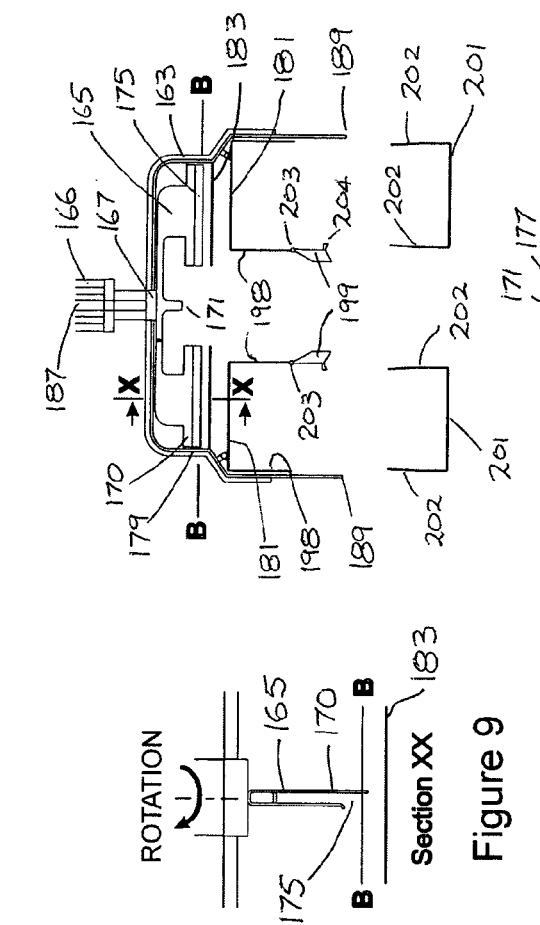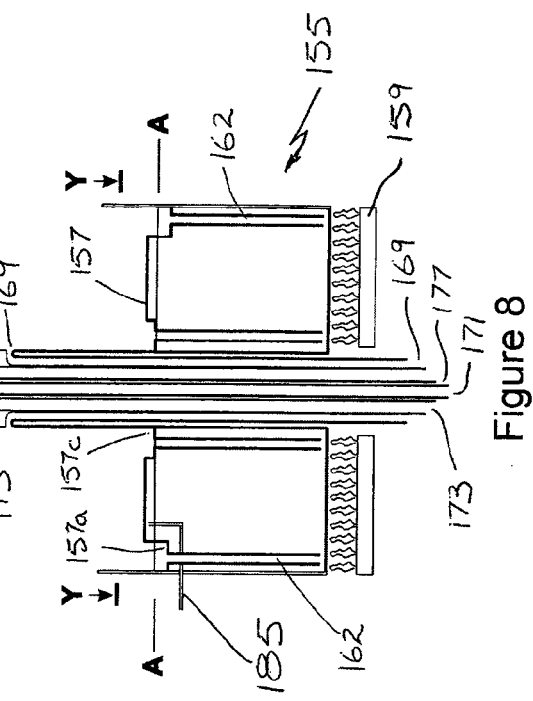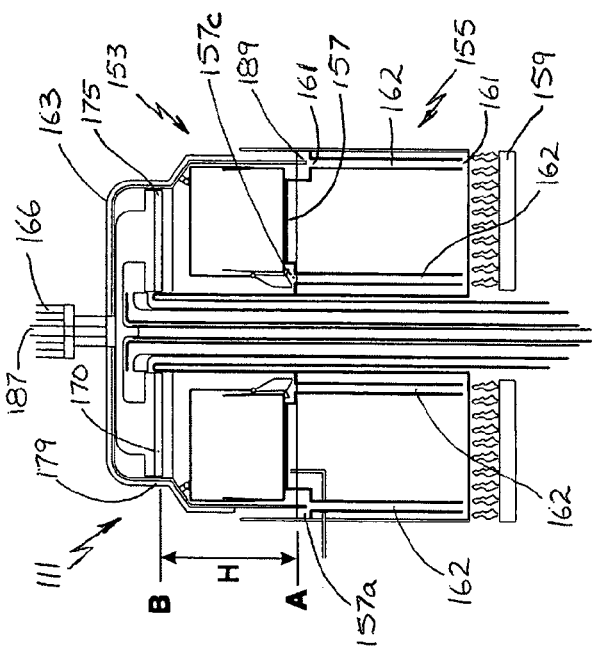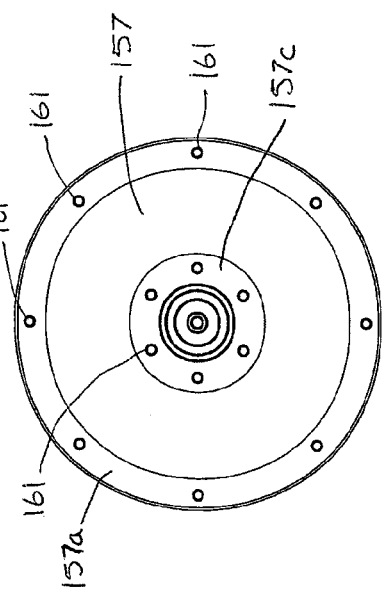

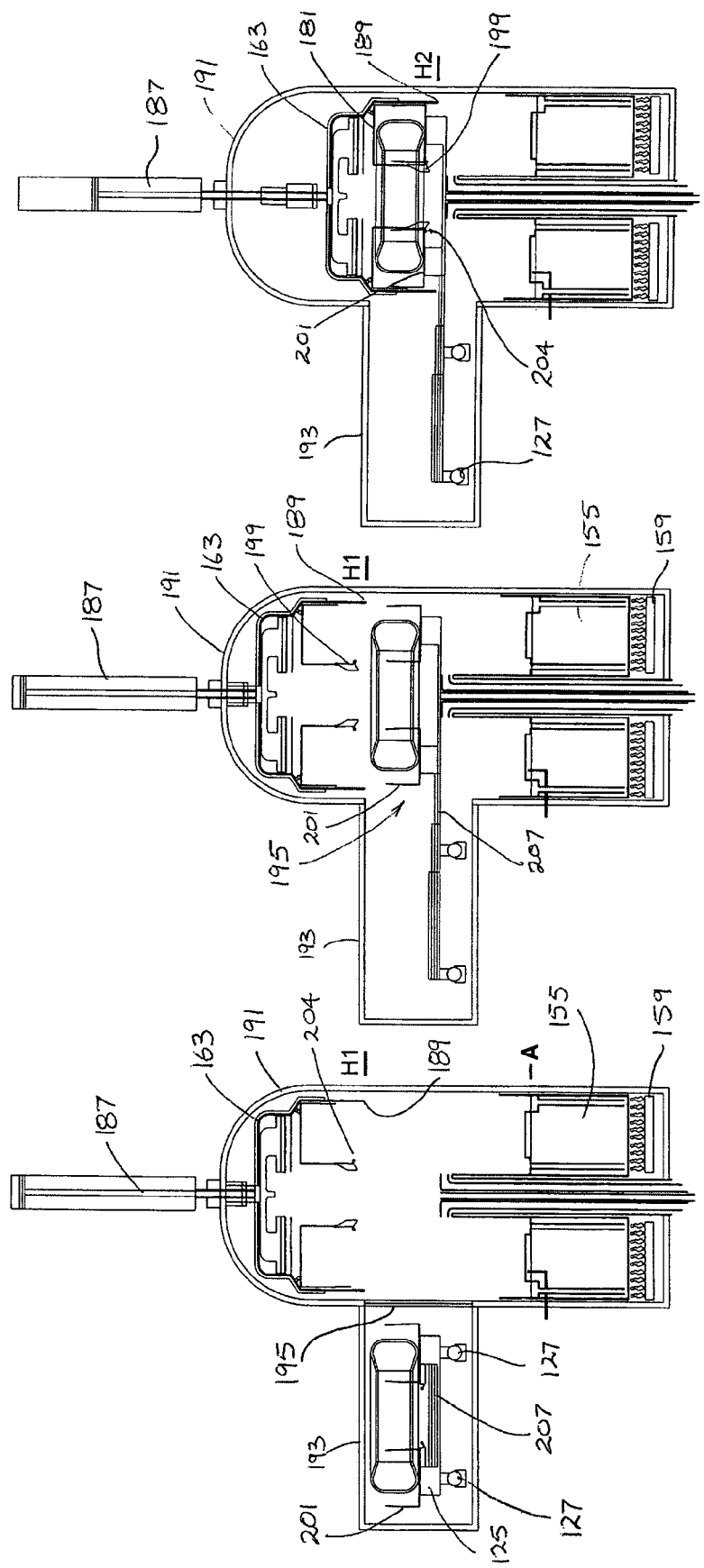

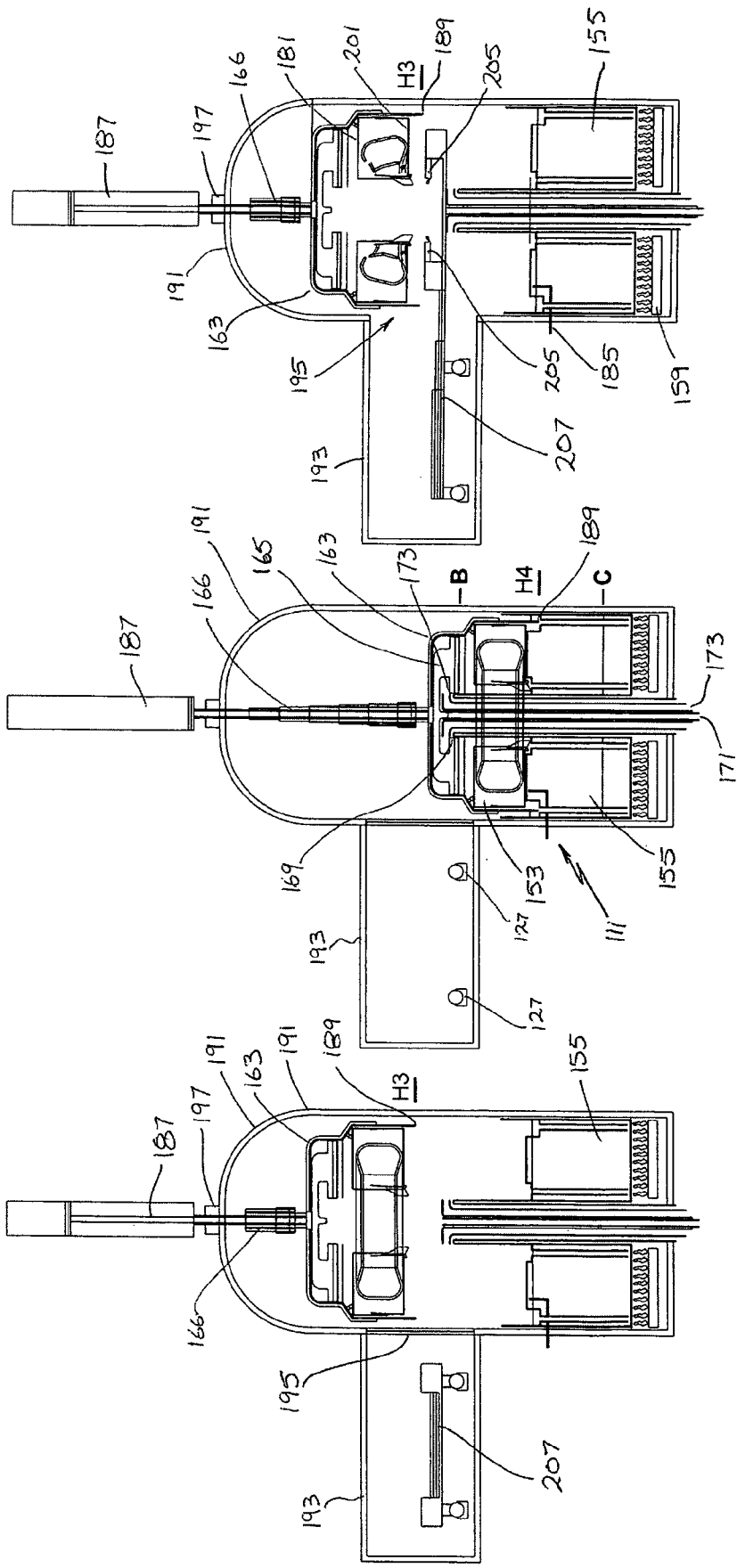

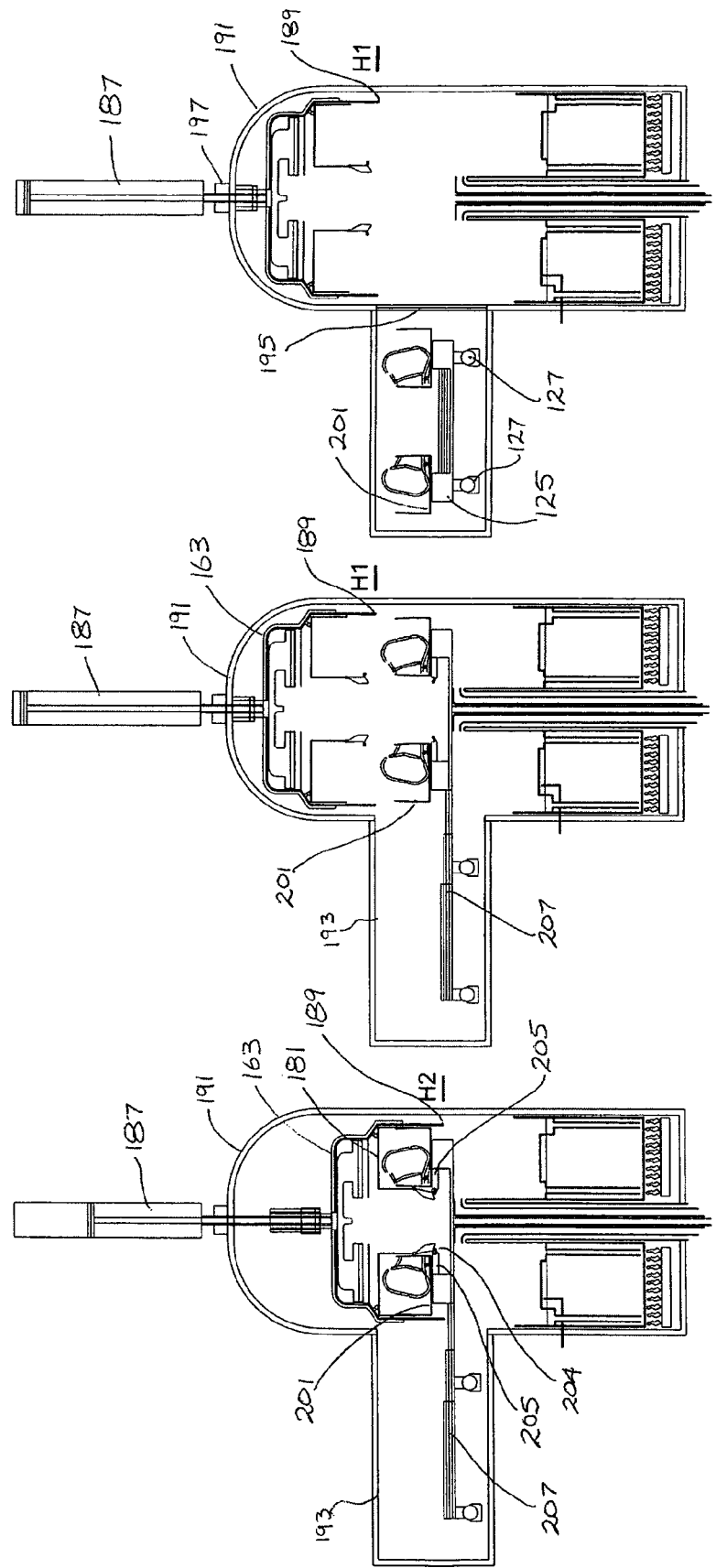

PROCESS AND APPARATUS FOR DECOMPOSITION OF POLYMER PRODUCTS INCLUDING THOSE CONTAINING SULPHUR SUCH AS VULCANISED RUBBER TYRES AND RECOVERY OF RESOURCES THEREFROM

FIELD OF THE INVENTION

This invention relates to a process for the decomposition of polymer products which may contain sulphur, and recovery of resources therefrom, and apparatus for performing the process. In particular this invention provides a process and apparatus for recycling vulcanised rubber tyres.

BACKGROUND ART

The following discussion of the background art is intended to facilitate an understanding of the present invention only. It should be appreciated that the discussion is not an acknowledgement or admission that any of the material referred to was part of the common general knowledge as at the priority date of the application.

Environmentally responsible disposal of waste tyres presents a tremendous challenge. Approximately 20 million waste tyres are generated in Australia annually and the number approximates 1000 million on a global scale. Traditionally, the majority of tyres were buried however many industrialised countries including Australia are enforcing bans to prohibit whole tyres going to landfill.

Most commercial processes dealing with waste tyres involve tyre shredding as a preliminary step to break tyres into managable pieces. Unfortunately, the very characteristics that make tyres long lasting and safe on the road such as durability, resistance to puncture and slicing, and resistance to decomposition at moderate temperatures, combine to make tyres exceptionally difficult to disintegrate. Commercially available tyre disintegrators include slicing machines, hammer mills, pyrogenic crushing, debeaders and manglers. While shredding overcomes some process difficulties for handling a bulky material of varying size, it greatly increases the capital and energy requirements of these processes.

Existing art teaches that shredding of waste tyres may be followed by physical processes to remove steel and fibre reinforcing materials to recover the rubber as various grades of rubber chips or crumb. Other methods dealing with waste tyres have been adopted by the cement industry, where tyres are used as a source of fuel in high temperature kilns where all of the solid residues are incorporated in the cement product.

An alternative process has been developed by Molectra, a company in Queensland, Australia, described in the specification for Australian patent AU2000278910B, which is a process for recovering materials from tyres that involves soaking tyres in oil and a volatile solvent followed by microwave heating.

A number of pyrolytic techniques to process waste tyres have also been described. However, these techniques have been beset with difficulties. Primary barriers to successful pyrolysis operations are both economic and technical.

With existing methods for the recovery of materials from waste tyres, the capital costs are high and the products from pyrolysis do not have sufficient value or purity to compete with virgin materials. Reaction products are chiefly liquid and gas hydrocarbons, carbon black and steel and in the existing processes, the products suffer from cross contamination to varying degrees, preventing their acceptance as raw materials.

In existing pyrolysis methods, heat is transferred to the rubber either by conduction, convection, infra red or microwave radiation. As rubber is a poor conductor of heat, these methods can lead to large temperature variations throughout the decomposing material. Variations in heating rates, temperature and vapour residence times during decomposition, lead to a vast spectrum of reaction mechanisms and associated hydrocarbon products.

Previously described processes utilise a low oxygen environment and may additionally use a range of materials to contact and transfer heat to the decomposing polymer products. United States patent specification US2002/10072644 A1 describes waste tyres being immersed in a bath of molten aluminium at a temperature of 800° C. in a refractory lined vessel to decompose the rubber to mostly gas products and carbon. Previously published processes also describe use of low melting point metals such as tin and lead as well as molten salt baths, alkaline earth metals, sand or gravel beds and mineral substances such as granulated silicates or aluminosilicates.

A shortcoming of existing pyrolysis methods is contamination of the carbon and steel solid residues. Pyrolysis char is highly porous and consists of many interconnected pores, cracks and channels formed as the volatile components escape from the rubber-carbon matrix. Granular materials and molten salts infiltrate these pores and are difficult to remove from the char. Molten lead and other metals may also penetrate the char and cause unacceptable levels of contamination.

One benefit of using a liquid metal heat transfer medium is that the high specific heat of metals and high conductance allows energy to be rapidly transferred to the waste polymer resulting in a rapid rate of decomposition at a more controlled temperature. High temperature molten metals have also been described for destroying toxic waste. In these cases the object is to break up the organic compounds at high temperatures in the order of 800-900 C into smaller organic gaseous species that do not have the toxic characteristics of the original compounds.

Lowering the decomposition temperature for rubber polymers results in longer chain molecules being formed, which favours production of liquid hydrocarbons, which on further refinement, can be used as transport fuels. The condensed oil from tyre pyrolysis may contain hydrocarbons with boiling point fractions in the range including kerosene, petrol and diesel. However, transport fuels must meet stringent quality and performance criteria, and particularly sulphur levels. Typically the condensable hydrocarbons have an offensive pungent odour due to high concentrations of complex sulphur compounds derived from the sulphur which is added to rubber in the vulcanization process.

Following the phasing out of lead in fuel, sulphur is being reduced from levels of over 500 ppm a few years ago to mandatory standards of 10 ppm. Low sulphur fuels allow catalytic converters with high efficiency to be used on vehicles. Like lead, sulphur poisons catalytic conversion processes of emissions reduction.

Sulphur is used to cross-link polymer chains in the process of vulcanization. In general terms, vulcanization results in about one in every 200 carbon double bonds forming a cross-link site with between 3 and 12 sulphur atoms. Sulphur at levels in tyres of about 2 phr (parts per 100 rubber) leads to crude decomposition hydrocarbons containing sulphur at levels far exceeding the limits for transport fuel standards.

A range of sulphur crosslinked polymer compounds constitute the rubber contained in waste tires. Decomposition involves the breaking of carbon—carbon and sulphur—carbon bonds. The presence of reactive sulphur atoms leads to the formation of thiophene derivatives responsible for the offensive odour of pyrolysis oil. These and other sulphur related compounds produce and detectable odour and detract from the commercial value of tyre derived products when present at levels above about 20 ppm. Hydrogen sulphide is also a by product contained in the non condensable gasses, which must be dealt with in order to meet acceptable environmental operation parameters.

While sulphur can be removed from crude oil fractions by hydro-treating and the same process could be applied to pyrolysis oil from waste tyres, this would require a high capital investment and extensive processing.

This invention seeks to provide a process and apparatus suitable for use in recycling rubber tyres, and recovering useful products from them. It is an object, in a preferred form of the invention, to provide apparatus for recycling whole tyres, without the need for shredding or cutting the tyres into pieces.

Throughout the specification unless the context requires otherwise, the word "comprise" or variations such as "comprises" or "comprising", will be understood to imply the inclusion of a stated integer or group of integers but not the exclusion of any other integer or group of integers.

Throughout the specification unless the context requires otherwise, the word "include" or variations such as "includes" or "including", will be understood to imply the inclusion of a stated integer or group of integers but not the exclusion of any other integer or group of integers.

DISCLOSURE OF THE INVENTION

In accordance with one aspect of the invention there is provided a method for the decomposition of a polymer containing product which may contain sulphur, and recovery of resources therefrom, said method comprising steps of immersing said polymer containing product in molten metal containing elemental zinc in proportion of 90% by weight or more and aluminium metal in proportion of up to 5.5% by weight, in apparatus containing a low oxygen atmosphere, recovering volatiles from said apparatus as said polymer product decomposes, and recovering residue from said molten metal.

In accordance with a second aspect of the present invention there is provided a process for the decomposition of a polymer containing product which may contain sulphur, and recovery of resources therefrom, said process including steps of a reaction step in which said product is contacted at low oxygen levels with molten metal containing elemental zinc in proportion of 90% by weight or more and aluminium metal in proportion of up to 5.5% by weight, recovering volatile fractions evolved during said reaction step, and recovering solids including metallic sulphides formed during said reaction step.

Preferably the polymer containing product containing sulphur is a vulcanised rubber product, and most preferably a vehicle tyre comprising vulcanised rubber.

Preferably said process includes a drying step prior to said reaction step to drive off any moisture present in said product.

Preferably the step of contacting involves submersion of said product in said molten metal.

Preferably the molten metal contains elemental zinc in proportion of about 92% by weight to 99.8% by weight, with the balance being chiefly aluminium. The elemental zinc may be present with one or more micro alloying agents which may depress the melting temperature or increase either the surface tension or the viscosity of the melt. The elemental zinc may also be present with minor trace impurities. As the process when used to decompose rubber products, forms sulphides of zinc, it is preferred that a large proportion of the metal in the molten metal is reactive toward sulphur.

Preferably the molten metal contains elemental zinc in proportion of at least about 94.5% by weight and aluminium metal in proportion of up to about 5.5% by weight.

Preferably the molten metal contains elemental zinc in proportion of at least about 94.9% by weight and aluminium metal in proportion of up to about 5.1% by weight.

Preferably the molten metal chiefly contains elemental zinc in proportion of from about 99% by weight to 99.8% by weight and aluminium metal in proportion of from 1% by weight to 0.2% by weight. The molten metal may contain minor trace impurities or micro alloying agents.

Preferably the molten metal contains elemental aluminium in proportion of about 1% by weight by weight to provide minimal adherence to the porous carbon residue. A further benefit of alloying about 1% by weight aluminium with elemental zinc is a property of reduced reactivity toward 316L stainless steel which can be used in the fabrication of the reaction apparatus, in addition to reducing the melting point of the molten alloy by approximately 7 degrees. Unexpectedly, a low percentage of aluminium, in the order of 1% by weight or lower, retains much of the properties of high viscosity and surface tension of zinc, in the resultant molten alloy. In addition there is an added benefit of reducing the coherence of any surface film on the molten metal, making it more easily broken up.

Preferably said reaction step is carried out with said molten metal at a temperature of at least 420° C., to a maximum temperature of 550° C. Generally lower temperatures will result in the reaction proceeding more slowly and producing a higher proportion of longer chain molecules, while higher temperatures will result in the reaction proceeding faster and producing a higher proportion of short chain molecules.

Preferably said reaction step is carried out with said molten metal at a temperature not exceeding 450° C.

Preferably said reaction step is carried out with said molten metal at a temperature in the range of from about 430° C. to about 440° C.

Preferably said reaction step is carried out with said molten metal at a temperature of about 434° C. At this temperature, the reaction step produces an optimally maximised proportion of liquid hydrocarbons including limonene.

Preferably said process is carried out in an apparatus having an atmosphere at sub-atmospheric pressure. This provides for minimum residence time of volatiles at high temperature and rapid dispersal to collection and post processing.

Preferably said volatile fractions contain a high proportion of limonene.

Preferably said process includes adding a finely divided zinc compound dispersant at the surface of the molten metal to assist in dividing solid flotation byproducts, and minimising metal adherence thereto.

Preferably the dispersant is an alkaline earth oxide.

Preferably the dispersant is calcium oxide.

Also, in accordance with a third aspect of the invention, there is provided apparatus for the decomposition of a polymer containing product which may contain sulphur, and recovery of resources therefrom, said apparatus having a reaction chamber capable of selectably containing said product, and selectably being filled with molten metal containing elemental zinc in proportion of 90% by weight or more and aluminium metal in proportion of up to 5.5% by weight, to a predetermined upper level within said reaction chamber at reduced oxygen levels in said reaction chamber to submerge said product in said molten metal, said apparatus having means to restrain said product at a lower level within said reaction chamber, said reaction chamber including a screen with a mesh sized to allow passage of volatile fractions and flotation products during the decomposition process, and to restrain agglomerated flotation products when the molten metal is drained, said screen being located at an intermediate level located between said upper level and said lower level and spaced therefrom, said reaction chamber having a reaction product outlet located above said upper level.

The process carried out at in the apparatus is preferably carried out at sub-atmospheric pressure, in addition to low oxygen levels. This provides for minimum residence time of volatiles at high temperature and rapid dispersal to collection and post processing. Low oxygen levels may be achieved by recirculation of non-condensable hydrocarbon gasses into the reaction chamber serving to regulate the sub-atmospheric pressure therein and provide dilution to the reaction vapours further reducing secondary reaction between them.

Preferably said polymer containing product comprises vulcanised rubber. Preferably said polymer containing product comprises tyres for motor vehicles. Most preferably the tyres are whole tyres.

Preferably said reaction chamber has a frustro-conical top narrowing toward said reaction product outlet, said reaction product outlet being located at the upper extent of said frustro-conical top.

Preferably the angle of the sides of the frustro-conical top lie at from about 30° to about 65° to the longitudinal axis of the frustro-conical top.

Preferably the angle of the sides of the frustro-conical top lie at from about 50° to about 65° to the longitudinal axis of the frustro-conical top.

Preferably the angle of the sides of the frustro-conical top lie at about 55° to the longitudinal axis of the frustro-conical top.

The means to restrain said product may comprise any obstruction to physically prevent the product from rising upward, and may comprise a plurality of parallel bars or a mesh arrangement.

Preferably said means to restrain said product comprises a cage to fully enclose said product, to contain it within said reaction chamber and to facilitate the removal and transport of solid residues after the decomposition process is concluded. The cage may be used to contain entire vehicle tyres or waste rubber and/or plastic in other forms such as cuttings, shreds, crumb or granules. The decomposition process may thereby be applied to wastes such as conveyor belts, rubber O rings, inner rubber tubes and also non rubber based polymers.

Preferably the means to restrain said product comprises a large aperture mesh, with an aperture size larger than that of the mesh of said screen. Alternatively, the means to restrain said product may comprise a perforated sheet, mesh or grille to physically prevent the product from rising upwards.

Preferably the means to restrain said product provides an even, distributed restraint force to minimise point forces which may promote the premature breakdown of any solid residues.

Preferably the means to restrain said product is a perforated screen or a woven mesh made from a material that has an obtuse contact angle with the molten metal.

Preferably said (upper) screen is a perforated sheet or a woven mesh made from a material that has an obtuse contact angle with the molten metal.

Preferably the mesh of said screen has an aperture size of up to 8 mm across. The mesh may conveniently comprise wire of 1 mm diameter. Aperture sizes in the range of 7.5 mm across, 7 mm across, 6.5 mm across, 6 mm across, or 5.5 mm across should prove suitable.

Preferably the mesh of said screen has an aperture size of from about 3 mm across to about 5 mm across.

Preferably the mesh of said screen has an aperture size of from about 4 mm across at 6 mm centers.

Preferably said screen has a varying aperture between its periphery and interior. The aperture of said screen is preferably of from about 2 mm across to about 5 mm across. The arrangement of perforations is such that gas and vapour are dispersed as small bubbles as they pass through the screen promoting maximum contact between the vapour and reactant metal.

Preferably said reaction product outlet includes means for evacuating solid reaction flotation products which form within said reaction chamber. The solid reaction flotation products that form are predominantly zinc sulphide and zinc oxide.

Preferably said apparatus includes a dispensing inlet for introducing finely divided particles of a zinc compound dispersant such as calcium oxide, at the surface of the molten metal, within said reaction chamber.

Preferably said means for evacuating solid reaction flotation products comprises an auger to transport solids which form, from the top of said reaction chamber.

As an alternative to the apparatus having a frustro conical top, the apparatus may have a removable or liftable top of cylindrical configuration to selectively enclose said reaction chamber.

Preferably said top has an annular lower edge, which when the top encloses said reaction chamber, rests in an annular recess in which is received, in use, a pool of molten metal, to provide a seal from outside atmosphere for said reaction chamber.

Preferably said apparatus includes a mixing device to mix the dispersant with solid reaction flotation products as they form. This minimises or prevents their agglomeration into oversize particles that might not be able to be evacuated from the reaction chamber.

Preferably means for evacuating solid reaction flotation products comprises a discharge port which is co-located with said mixing device, to sweep up solid reaction flotation products from the surface of said molten metal.

Preferably said mixing device comprises a set of rotating vanes, and said discharge port comprises a plurality of discharge inlets, one associated with each vane of said set of rotating vanes. In this arrangement the flotation products are swept into the discharge inlets associated with the rotating vanes by a flow of process gas that is rapidly exhausted from a circular port associated with the rotating vanes, the circular port being located in an upper region of the reaction chamber.

The dispersant may be an alkaline earth dispersant such as calcium oxide. This has the advantage of reducing metallic inclusions and enhancing flow through a reaction product outlet when using an auger or pneumatic conveyer.

Preferably said reaction product outlet also includes ductwork maintained at a reduced pressure to draw off volatile fractions of resources being recovered from said polymer containing product.

Preferably said apparatus includes a heated reservoir located below said reaction chamber, said heated reservoir being provided to contain molten metal, and said apparatus includes fluid control means to controllably admit said molten metal into said reaction chamber and to controllably evacuate said molten metal from said reaction chamber. The heated reservoir and reaction chamber should be thermally insulated, to reduce energy demand.

Preferably the heated reservoir is arranged to maintain the molten metal at a selected temperature in the range of 420° C. to 550° C., and most preferably between 430° C. and 440° C.

Preferably the movement of molten metal between the heated reservoir and reaction chamber is by hydrostatic means whereby a pressure differential between the reaction chamber and heated reservoir of the reaction chamber supports the level of molten metal at the predetermined upper level within the reaction chamber. The reaction chamber preferably operates in a region of reduced atmospheric pressure of preferably 60 kPa to 90 kPa absolute pressure. In one arrangement a reduced pressure of about 71 kPa is effective.

Preferably said reaction chamber has a shallow conical base sloping toward a centrally located port which extends through said heated reservoir, said port communicating between said reservoir and said reaction chamber, providing a flow pathway for said molten metal.

Alternatively said reaction chamber has an annular base incorporating said annular recess, and a plurality of ports are provided extending from the annular base, down to near the bottom of said heated reservoir, providing a flow pathway for said molten metal.

Preferably said apparatus is associated with a drying chamber for driving off moisture before decomposition in said reaction chamber.

Preferably said heated reservoir is heated by burners, and said said drying chamber being heated by exhaust gas from said burners.

Preferably said apparatus is associated with a conveyor for conveying said polymer containing product between said drying chamber and said reaction chamber, and conveying breakdown residue from said reaction chamber to a disposal chute.

Preferably said reaction chamber is selectively atmospherically isolated from outside, and can be evacuated to low pressure by being in series connection with a hydrocarbon vapour condenser and a vacuum pump.

Preferably said drying chamber is selectively atmospherically isolated from outside, and can be evacuated to low pressure by being connected to a vacuum line.

Preferably said drying chamber and said reaction chamber, are atmospherically isolated from each other, and may atmospherically communicate with each other while remaining atmospherically isolated from outside.

Preferably said drying chamber, said reaction chamber, and said disposal chute are atmospherically isolated from each other, and may atmospherically communicate with each other while remaining atmospherically isolated from outside.

Preferably there is provided a means for periodically introducing zinc into the reaction chamber to replace the zinc that is consumed primarily in the reaction Zn+S->ZnS and removed as sulphide and also zinc that is consumed primarily in the reaction Zn+->ZnO due to reactions with oxygenated compounds in the tyre composition. Preferably, the replacement zinc is added as a solid alloy by incorporating it with an incoming tyre by automatic metering at periodic intervals.

Preferably said disposal chute includes a hopper for receiving solid breakdown residue, said hopper having a cylindrical body contained within a cylindrical housing, said cylindrical housing having an upper longitudinal opening along an uppermost extent and having a lower longitudinal opening along a lowermost extent, where said cylindrical body is rotatable within said cylindrical housing and has a longitudinal opening, where when said longitudinal opening is aligned with the uppermost opening said disposal chute can receive solid breakdown residue in said cylindrical body, and when said longitudinal opening is aligned with the lowermost opening said cylindrical body can discharge breakdown residue; said hopper providing an air-lock function to isolate atmosphere within said apparatus, from atmosphere outside said apparatus.

Preferably said auger leads to a hopper for receiving flotation products evolved during breakdown of said polymer containing product, said hopper having a cylindrical body contained within a cylindrical housing, said cylindrical housing having an upper longitudinal opening along an uppermost extent and having a lower longitudinal opening along a lowermost extent, where said cylindrical body is rotatable within said cylindrical housing and has a longitudinal opening, where when said longitudinal opening is aligned with the uppermost opening said disposal chute can receive solid flotation products in said cylindrical body, and when said longitudinal opening is aligned with the lowermost opening said cylindrical body can discharge flotation products; said hopper providing an air-lock function to isolate atmosphere within said reaction chamber and said reaction product outlet, from atmosphere outside said apparatus.

Alternatively, with the arrangement where the means for evacuating the flotation products and dispersant oxides from the reaction chamber is associated/co-located with the mixing device, flotation products are conveyed from the circular port through a discharge pipe to a cyclonic separator.

With this arrangement, an introduced surface layer of alkaline earth oxide serves to break up and disperse the floating solid residues and facilitate their removal. Mechanical stirring enhances the effectiveness of the dispersion of the floating residues.

Preferably the alkaline earth oxide is introduced to the reaction chamber following the total immersion of the tyre in the molten metal and removed prior to the draining of the metal from the decomposed tyre. In this way, the residue carbon is not contaminated with alkaline earth oxide or the oxides and sulphides formed or released during the decomposition.

The post processing of the floatation products zinc sulphide and zinc oxide may utilise a carbothermic reaction to recover elemental zinc. This process requires the introduction of calcium oxide in any event as it serves as a scavenger for sulphur, forming calcium sulphide. Mixing the floating zinc based compounds with calcium oxide is therefore not detrimental to the overall recovery of resources from the tyres.

Preferably, the process heating requirements are derived from combustion of non condensable gases of the decomposition of the polymer, however alternative means for heating such as electrical resistance heating, induction heating or the combustion of petroleum fuels may be applied.

Preferably, the apparatus may utilise electrical resistance heating to maintain sections of the reactor apparatus at optimum process temperatures. This is preferably applicable to the upper sections of the reactor chamber and the solids residue removal apparatus.

Preferably the apparatus maintains optimum process temperatures by porting or ducting process heat optimally through sections of the reactor apparatus.

Preferably the heating of a reaction chamber may be accomplished by circulation of a heat exchange fluid such as molten lead. A centralised heating system using combustion of non condensable gases of the decomposition of the polymer is applicable when multiple instances of the reaction chamber are used in one installation. When multiple reactors operate together there is increased output and economy in the post-processing of the reaction products.

BRIEF DESCRIPTION OF THE DRAWINGS

Two preferred embodiments of the invention will now be described in the following description of an apparatus and process for pyrolytic decomposition of used vehicle tyres, made with reference to the drawings in which:

FIG. 6 is a vertical cross section of apparatus of the second and most preferred embodiment;

FIG. 7 is a top plan further cross section of part of the apparatus of FIG. 6;

FIG. 8 is an exploded vertical cross section view of the apparatus of FIG. 6;

FIG. 9 is a cross section view of the rotating vane within the reaction chamber of the apparatus of the second embodiment;

FIGS. 11-19 are cross section views showing stages in the process cycle of the apparatus of the second embodiment.

BEST MODE(S) FOR CARRYING OUT THE INVENTION

Figure 1:
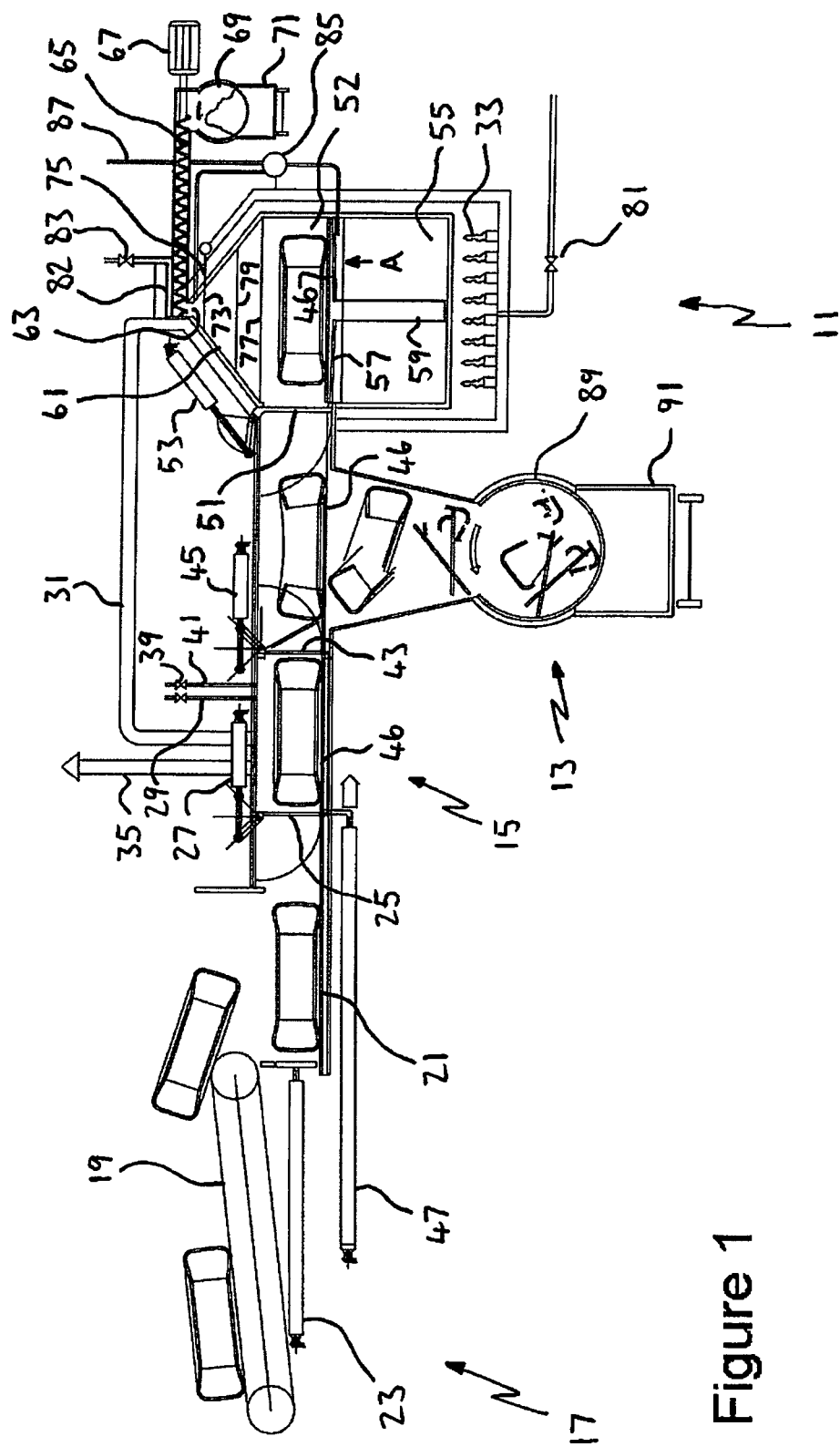
FIG. 1 is a cross sectional representation of an apparatus according to the first embodiment.
Figure 2:
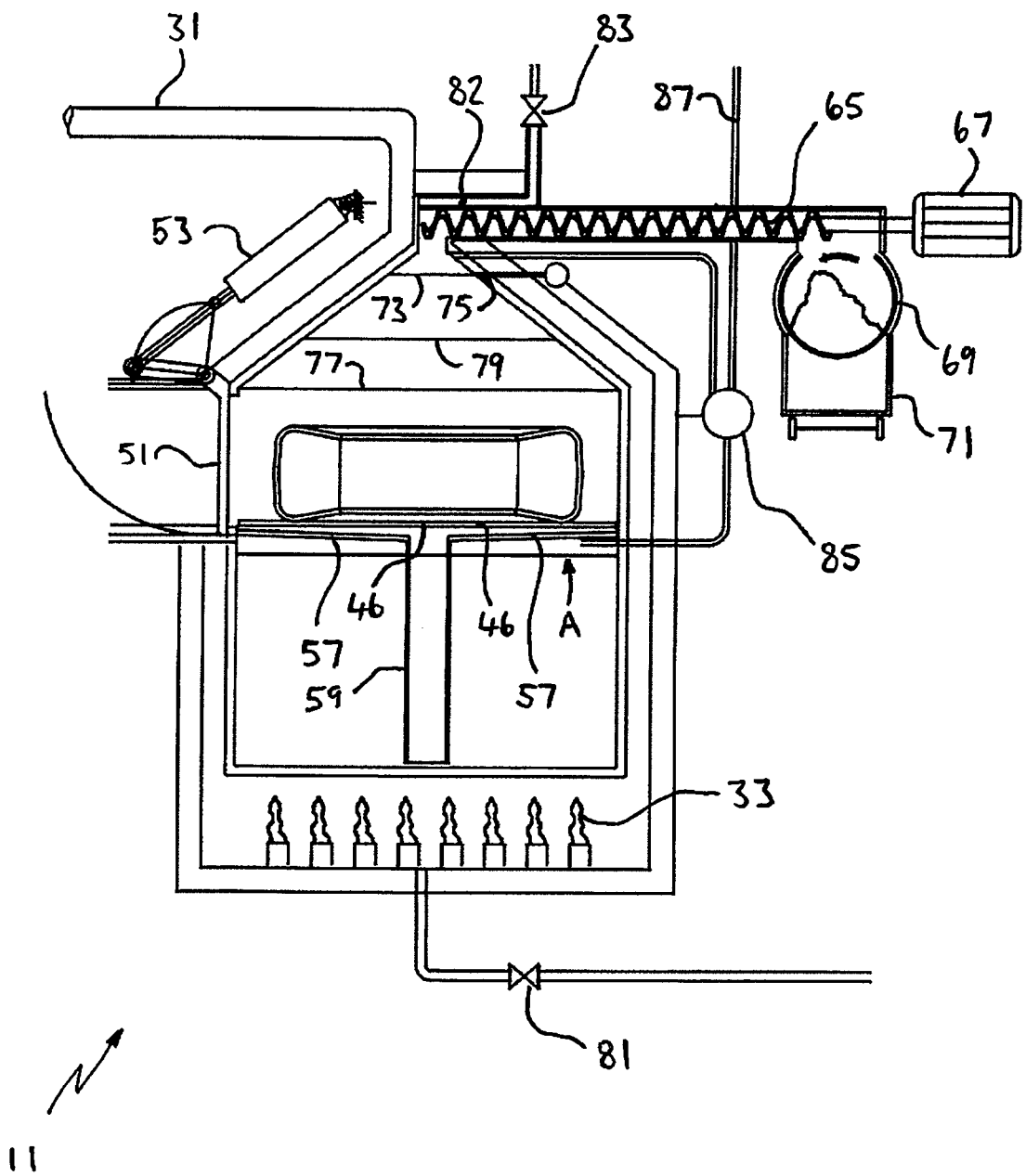
FIG. 2 is a view of part of the apparatus of FIG. 1 showing the apparatus in a stage of operation.

The embodiment is an apparatus for pyrolytic decomposition of used vehicle tyres. The apparatus consists of a reactor 11 which is a thermally insulated reaction vessel, a solids residue discharge chamber 13, a contaminant evacuation chamber in the form of a drying chamber 15 and a transport apparatus 17.

Waste tyres to be pyrolysed are fed by means of a belt conveyor 19 of the transport apparatus 17, and dropped from the belt conveyor 19, onto a bed 21 located in front of a linear actuator 23 which is shown in its fully retracted state.

By means of a signal from the control system (not shown) a gate 25 opens by means of an actuator 27. The linear actuator 23 is controlled to then push the tyre into the drying chamber 15.

With the tyre positioned in the drying chamber 15, the gate 25 is closed and air is evacuated from the drying chamber 15 by pipe 29 connected to a vacuum pump (not shown).

The drying chamber 15 is heated above ambient temperature preferably 60-80 C by hot exhaust gasses which are supplied by duct 31 from burners 33 in the reactor 11. The exhaust gasses supplied by the duct 31 leaving the drying chamber 15 pass through emissions control apparatus (not shown), and are vented to atmosphere by chimney stack 35.

The drying chamber 15 removes air and other volatile contaminants from the waste tyre to prevent dilution or contamination of the volatiles and gases within the reactor 11 with air or moisture. The process control provides for a tyre to be the drying chamber 15 for a period of time approximately equal to the apparatus cycle time of 5 to 6 minutes. If water is present in the tyre it must be removed prior to decomposition, so a vacuum sensor (not shown) communicates with the control system to prevent the process from proceeding until all water is removed.

The tyre remains under reduced pressure in the drying chamber 15 while a tyre is being decomposed in the reactor 11. When the air and volatile contaminants are removed from the drying chamber 15, and just prior to completion of the decomposition of the tyre in the reactor 11, a control valve 39 opens on pipe 41 to fill the drying chamber 15 to atmospheric pressure with pyrolysis gas from the process. It will be understood that the drying chamber is sealed from the outside atmosphere by the gate 25 and a further gate 43 located on the opposite side of the tyre from the gate 25.

Once decomposition of a tyre currently in the reactor 11 is complete, the drying of the tyre in the combustion chamber should also be complete. The gate 43 is then partially opened by a control signal to actuator 45. With the gate 43 in the partially opened position, a perforated tray 46 is capable of traversing below the underside of the lower extent of the gate 43. A linear actuator 47 and coupling 49 provides means for moving the tray 46 which is mounted on parallel guide rails (not visible in the drawings) extending from the reactor 11 to the drying chamber 15. When actuator 47 is in the fully retracted state, the perforated tray 46 is pulled under the tyre while it is within the drying chamber 15.

Gate 43 now fully opens by actuator 45 and gate 51 of a reaction chamber 52 of the reactor 11 also opens by a signal to actuator 53. The tyre, sitting on the perforated tray 46 is moved by actuator 47 and coupling 49 along guide rails to be fully inserted into the reaction chamber 52. The coupling device 49 is withdrawn so that the door 51 can close. Actuator 53 closes door 51 sealing the reaction chamber 52.

Door 43 is closed by actuator 45 and the steps to move a new tyre into the drying chamber 15 are repeated. Zinc alloy solids may be periodically placed onto the tray by a hopper and metering device (not shown) to maintain the volume of reactant metal in the process. The pyrolysis gas within the evacuation chamber is first extracted by the vacuum system by pipe 29, following which, air is admitted to the drying chamber 15. It is to be understood that reaction products are prevented from escape from the apparatus to the environment by removing any reaction products from chambers which communicate with the atmosphere before they are opened.

The reactor 11 is divided into two sealed compartments being the reaction chamber 52 and a heated reservoir 55 by a horizontal baffle 57. The horizontal baffle 57 is of shallow conical form, sloping downward toward a port 59 in the centre of the baffle 57. The baffle 57 forms the floor of the reaction chamber 52.

The heated reservoir 55 contains molten zinc alloyed with 5% by weight aluminium to depress the melting point and also to reduce corrosion in the reactor 11, and is heated to between 430° C. and 440° C., ideally 434° C. by burners 33. The port 59 operates as a drain for the sloping floor of the horizontal baffle 57 and extends nearly to the bottom of the heated reservoir 55. The port 59, being open at each end, provides for the movement of molten zinc between the heated reservoir 55 and the reaction chamber 52.

The reaction chamber 52 has a frustro-conical top 61 with a reaction product outlet 63 at the top. Located within the reaction product outlet 63 is a screw auger 65 driven by a drive motor 67, provided to transport to a gas-tight transfer station 69 solid waste such as sulphides and oxides of zinc which are formed in the reaction chamber. The gas-tight transfer station 69 can be selectively emptied into a bucket conveyor 71.

The gas tight transfer station 69 is in effect a hopper having a cylindrical body contained within a cylindrical housing. The cylindrical housing has an upper longitudinal opening along an uppermost extent through which solids can be received from the auger. The cylindrical housing also has a lower longitudinal opening along a lowermost extent.

The cylindrical body is rotatable within the cylindrical housing and has a longitudinal opening. When the longitudinal opening is aligned with the uppermost opening, the hopper can receive solid from the auger into the cylindrical body, and when said longitudinal opening is aligned with the lowermost opening the cylindrical body can discharge the solids. The hopper provides an air-lock function to isolate atmosphere within the reaction chamber and the reaction product outlet, from atmosphere outside the apparatus.

Located at an upper level 73 in the reaction chamber 52 is a sensor 75 which detects the level of molten zinc, and is used to feed back to control systems to control the level of molten zinc in the reaction chamber 52.

Located in the reaction chamber 52 above where a tyre sits, at a "lower" level is means to restrain the tyre from floating upwards, in the form of a perforated screen 77. Located between the upper level and the perforated screen 77 is a second perforated screen 79 with a 4 mm aperture mesh with 6 mm centers. The second perforated screen is of a mesh sized to allow passage of volatile fractions and flotation products during the decomposition process, and to restrain agglomerated flotation products when the molten metal is drained.

Molten zinc is maintained at a level shown A in the lower compartment. Burners 33 heat the reactor vessel to maintain the temperature in the region of 430-440 C. The burner may use pyrolysis gas supplied from a storage vessel via pipeline and control valve 81.

The reaction chamber 52 has a gas discharge manifold 82 and control valve 83 leading from the top of the reaction chamber such that when a suction is applied, the pressure in the reaction chamber 52 is reduced. The reduced pressure in the reaction chamber 52 relative to the pressure in the space above the molten zinc alloy in the heated reservoir 55 causes liquid zinc alloy to flow through port 59 and fill the reaction chamber 52. Pyrolysis gas is introduced to the space above the molten metal in the heated reservoir 55 (above the level A) by a control valve 85 at a pressure intermediate that of atmospheric pressure and the reduced pressure in the reaction chamber 52.

As the liquid level in the reaction chamber 52 rises (and the level A of molten zinc falls), the tyre initially floats since the density of the tyre is lower than that of the molten metal. The tyre continues to rise as the metal fills the reaction chamber 52 until it contacts the perforated screen 77.

The molten metal then totally immerses the tyre and continues to rise in the reaction chamber 52 past the second perforated screen 79 to the upper level 73. Any residual zinc compounds from the previous cycle that were restrained by screen 79 float upwards on the rising molten metal.

The sensor 75 detects the level of the metal and provides feedback to the control valve 85 to maintain the pressure in the heated reservoir 55 such that the pressure differential supports the head of liquid zinc in the reaction vessel. While the liquid metal is contained predominantly in the reaction chamber 52, the control system reduces the intensity of the burners 33 to prevent overheating of the heated reservoir 55.

The vacuum in the reaction chamber 52 varies during the course of the decomposition as the vapour and gas products are withdrawn. Control valve 85 connected to vacuum pipe 87 regulates the pressure differential between the reaction chamber 52 and the heated reservoir 55 to maintain the molten metal liquid level at the upper level 73.

The tyre rapidly reaches the temperature of 430-435 C and as it decomposes, vapours, gas and zinc compounds rise in the molten metal and pass through screens 77 and 79, and the zinc compounds and minor solid residues float on the surface of the liquid at the upper level 73.

The zinc compounds, primarily zinc sulphide and zinc oxide, form a spongy mass which is elevated by the flow of gas and vapour into the outlet 63, of the reaction chamber 52.

The screw auger 65 transfers the zinc compounds to the gas tight transfer station 69, consisting of a cylindrical compartment which periodically rotates during an interval while a new tyre is being loaded, to dump the contents into the bucket conveyor 71 for conveyance to a zinc process station (not shown). The zinc compounds comprise zinc sulphide formed by reaction of zinc and sulphur contained in the rubber, and zinc oxide used in the manufacture of the tyre. These zinc compounds are solubilised and the zinc is recovered by electrowinning. The process provides for the recovery of zinc in the form of zinc oxide contained in the rubber and post processing of the zinc compounds into metallic zinc supplies most if not all of the zinc requirements of the process.

Gas and hydrocarbon vapours are collected from the outlet 63 of the reaction chamber 52 by the gas discharge manifold 82.

Figure 3:
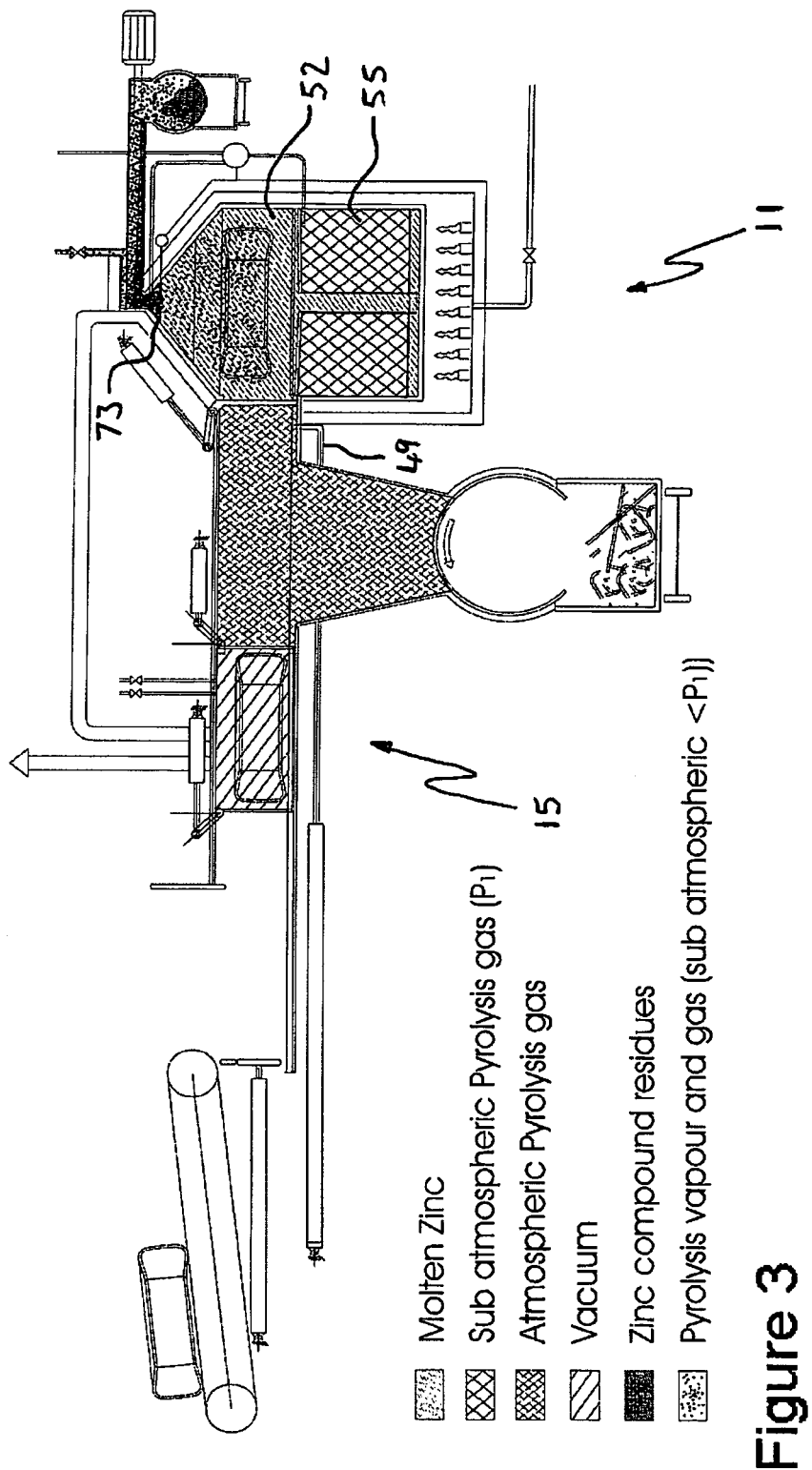
FIG. 3 is a cross sectional representation of the apparatus of FIG. 1 showing the apparatus in a stage of operation.

Referring to FIG. 3, the apparatus is shown with a tyre in the reactor 11 undergoing decomposition in the reaction chamber 52, and molten zinc alloy as described, at the upper level 73, and another tyre in the drying chamber 15. The key in the drawing identifies differing atmosphere and liquid and solid components.

The vacuum pump reduces the pressure within the reaction chamber 52 to as low as is possible, so that vapours and gas are swept quickly from the gas discharge manifold 82 to a condensing station and conditioning apparatus (not shown) to separate the liquid hydrocarbon fractions from gases such a hydrogen, methane and ethane. The gas passes through a vacuum pump to be stored in a gas receiver tank and reticulated to the burners 33 or used as an energy source such as a fuel for internal combustion engines or gas turbines associated with generating electricity for the process.

The vapours are condensed to liquids and separated from gases by conventional means. The pyrolysis oils and/or gases may undergo post-processing by methods familiar with those skilled in chemical processing such as fractional distillation, hydro treating, cracking, catalytic conversion, scrubbing and membrane filtering.

At the end of the waste tyre decomposition, the gas flow at control valve 83 ceases and a control signal initiates the solid residue removal cycle. This begins with the control valve 85 adjusting the differential pressure in between the reaction chamber 52 and the atmosphere in the heated reservoir 55, by the introduction of process pyrolysis gas, causing the level of liquid zinc to fall.

As the level falls, residual zinc compounds at the outlet 63 of the reaction chamber 52 that have not been collected by the screw auger 65 remain on the surface of the zinc. The zinc compounds are caught on the screen 79. It was discovered that such compounds will not pass through the screen 79, but remain suspended by the screen 79 until the next cycle. Contaminant free molten zinc drains out of the reaction chamber 52 of the reaction vessel through the port 59.

It is a characteristic of the apparatus of the embodiment that the decomposed tyre is preserved in its original shape as a fragile matrix of carbon and metal wire. The carbon surrounding the bead wires and the belt wires shields the metal from contact with the zinc and avoids the tendency for zinc to contaminate the steel. Because of the controlled draining of liquid zinc, the fragile residue remains intact and can be withdrawn on the perforated transfer tray 46.

Figure 4:
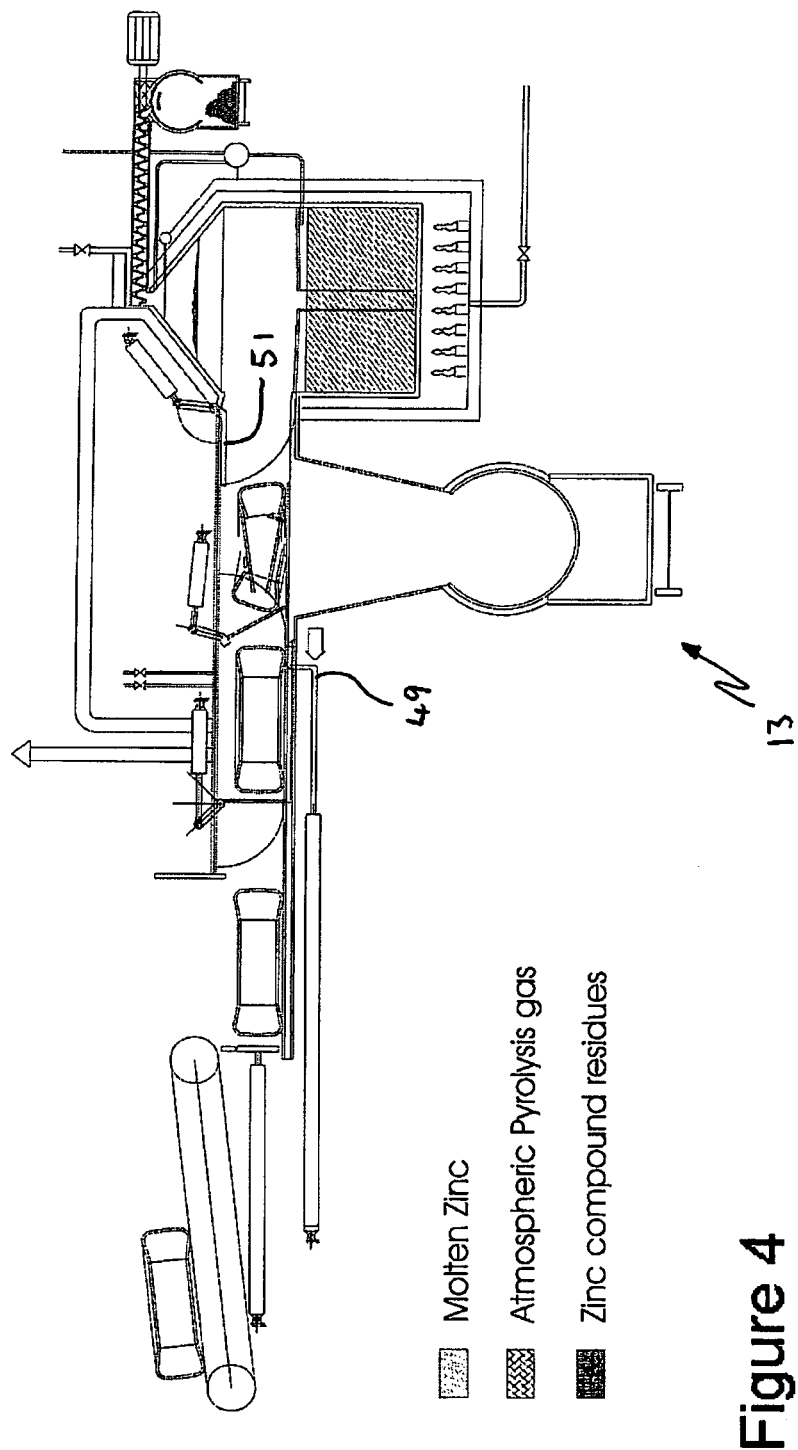
FIG. 4 is a cross sectional representation of the apparatus of FIG. 1 showing the apparatus in another stage of operation.

When the pressure in the reaction chamber 52 returns to atmospheric and the zinc drains to the heated reservoir 55, the gate 51 is opened by the actuator 53. The coupling 49 engages the tray 46 and the actuator 47 withdraws the tray 46 and the solid residue remains of the tyre casing from the reaction chamber 52. Referring to FIG. 4, the apparatus is shown with the solid residue remains of the tyre about to be dropped into the solids residue discharge chamber 13.

The gate 51 closes after the residue is withdrawn to prevent carbon fines from the solids residue discharge chamber 13 from entering the reaction chamber 52.

Meanwhile, the vacuum within the drying chamber 15 is replaced by pyrolysis gas to atmospheric pressure in readiness for the next cycle. The actuator 45 moves gate 43 to a position such that the lower edge of gate 43 has minimal clearance above the tray 46 as it passes below.

The gate 43 prevents the solid residue from remaining on the tray 46 as the tray 46 advances toward the drying chamber 15.

As the tray moves away from the reactor 11 and towards the drying chamber 15, the solids fall into the residue discharge chamber 13 and generally break up.

The discharge chamber 13 has a gas tight cylindrical "valve" 89, which by controlled rotation periodically discharges the residue into a bucket conveyor 91 to be carried off to further processing. The gas tight cylindrical valve 89 is of similar configuration to the hopper described in connection with discharge of solid into the gas transfer station 69, albeit scaled up.

The tray 46 returns to the evacuation chamber and slides below a tyre that has had volatile contaminants and air removed from it in the drying chamber 15. At this point, the cycle repeats.

The reaction chamber is typically constructed of 316L stainless steel which resists attack by molten zinc aluminium alloy described. The temperature of operation of the process of the invention avoids the need for use of refractory materials. Super alloys are incorporated in high performance areas of the reaction chamber such as the vessel door and door seal of the present invention, and the screens 77 and 79. A suitable material is a carbide rich super alloy known as MSA 2020 supplied by Metaullics Systems Division, Pyrotek Inc, USA, which maintains an obtuse contact wetting angle and does not exhibit reactive wetting on prolonged contact with molten zinc. In contrast, zinc will wet and spread over 316L stainless steel. If the door and associated mating flange of the reaction chamber were constructed of 316L stainless steel one would expect operational problems to arise.

While the reactant metal for this invention is zinc, the addition of around 1% by weight of aluminium will modify the melting and corrosion characteristics of the zinc, greatly reducing the corrosion of 316L stainless steel components making up the reaction vessel. Adding aluminium toward the eutectic of about 5% by weight aluminium will reduce the melting point to 382 C and hence the minimum operating temperature of the reaction chamber.

Though testing on a pilot scale, it was observed that the zinc compounds forming on the top of the molten zinc form a spongy mass. It was further observed that the sponge incorporated within it a significant quantity of metallic zinc. When cooled down the spongy mass hardened into a solid mass due to the solidification of the zinc inclusions. It appears to be a property peculiar to zinc that oxides and sulphides forming a floating dross contain a large proportion of metal inclusions which will not freely drain. Methods to recover zinc from dross such as hot pressing and rotating drums using centrifugal forces can be used, however these are inconvenient. In the development of the invention, it was discovered that if the solid compounds forming below the surface of the liquid metal and rising due to lower density are carried by the gas and vapour products of the reaction to a constricted exit point, the solids can be sufficiently dispersed by gas and vapour voids to minimise the amount of zinc being trapped and carried with the zinc compounds. This is achieved by the frustro-conical shape of the top of the reaction chamber 52. Although a small amount of metallic zinc can be carried, the incidence is not sufficient for the compounds to harden on cooling which otherwise occurs and makes processing difficult. The bulk material characteristics of the solid compounds are further enhanced by the metering of a dispersant oxide such as calcium oxide into the reaction products auger.

A most preferred arrangement of the invention has multiple instances of the apparatus operating simultaneously thereby increasing the processing capacity.

Figure 5:
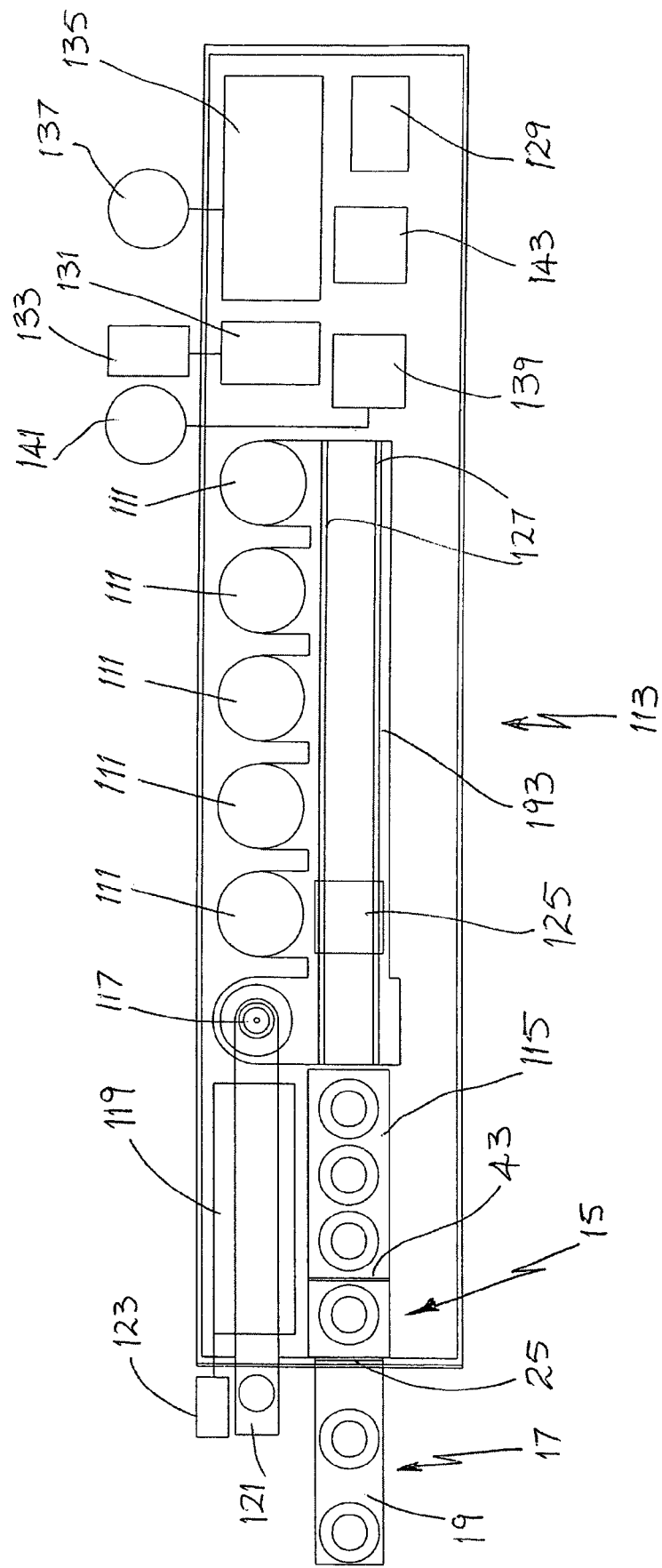
FIG. 5 is a representation of multiple reactors according to the second embodiment, and associated post-processing and material handling stages housed in a modular system of the dimensions of a 40 foot shipping container.

FIG. 5 illustrates a series of five modules of reactor 111 operating within a transportable module 113 of internal dimensions equal to a standard 12.01 m×2.33 m shipping container.

Waste tyres to be pyrolysed are fed by means of a belt conveyor 19 of the transport apparatus 17 and enter a drying chamber 15 through gates 25 and 43 which atmospherically isolate the chamber.

The tyres then pass to a chamber 115 which can hold several tyres and serves a repository for dried, pre-heated tyres awaiting decomposition. Both the drying chamber 15 and chamber 115 are heated above ambient by hot exhaust gasses exiting from burners in the reactors.

A solid residue discharge chamber 117 receives char and steel residue from the decomposition process. The steel reinforcement in the tyre residue is preferably separated from the carbon by use of magnetic and vibratory sorting within the apparatus 119. For passenger tyres, the hoop reinforcement typically contains about 30 loops of a 0.9-1.0 mm wire. These are conveyed through an exit chute 121 from the apparatus as circular loops to avoid entanglement. Powdered carbon is conveyed from the apparatus to a storage vessel 123.

Waste tyres and the decomposition residues can be selectively loaded and discharged from each of the reactors by a movable shuttle 125 running on guide rails 127. The position and functions performed by the shuttle are controlled by a central computer system 129. Each tyre from chamber 115 is loaded into a perforated tray which is transported and selectively deposited into each reactor in a cyclical manner. After decomposition, the shuttle removes decomposed residue on the perforated tray and transports it to the solid residue discharge chamber 117. The shuttle constrains the tray to a pivoting linkage mechanism that rotates and inverts the tray to deposit the residue within the discharge chamber. In the centre of the discharge chamber are conical shaped guides that align with the central axis of the perforated tray to capture and orientate the hoop wire coil allowing it to maintain its form and avoid entanglement.

At the end of decomposition, the floating solid residues in the reaction chamber are pneumatically conveyed by flow of non condensable hydrocarbon gas into a cyclonic separator 131. The cyclonic separator uses a centrifugal compressor to generate a sufficiently high gas velocity to maintain solid residues in suspension as they are ducted to the cyclonic separator. Cyclonic separation is used to isolate the zinc reaction products and an alkaline earth oxide dispersant from the recirculating gasseous conveying stream. A portion of the alkaline earth dispersant is returned for re-use after being sieved and separated by powder floatation techniques. Powdered zinc reaction compounds are removed to an external storage vessel 133.

Hydrocarbon vapour at sub-atmospheric pressure is passed through a cooling condenser 135 where the liquid hydrocarbons condense and are collected in an external storage vessel 137. A vacuum pump 139 maintains a sub-atmospheric pressure inside the condenser and reactor vessel and compresses the non-condensable gasses for storage in external vessel 141.

The compressed non-condensable hydrocarbon gasses may be used as the fuel for heating the reactor vessels. For remote installations the hydrocarbon gas may also fuel an internal combustion engine and an electrical generator 143 to supply electrical power for the control systems, actuators, motors, computers and monitoring apparatus.

A second preferred embodiment being an apparatus for the decomposition of whole tyres in the form of a reactor vessel 111 is shown in FIG. 6. The reactor 111 is divided into two sealed compartments being the reaction chamber 153 and a heated reservoir 155, located below the reaction chamber 153, separated by a horizontal baffle 157. The horizontal baffle 157 forms the upper portion of the heated reservoir 155 and the floor of the reaction chamber 153.

A sub-atmospheric pressure in the reaction chamber sufficient to support a column of molten alloy of height "H" is maintained at all times during the reaction step.

FIG. 7 is a top view of the heated reservoir and corresponds to a section located above the horizontal baffle taken at Y-Y in FIG. 8.

The heated reservoir 155 contains molten zinc alloyed with 1% by weight aluminium maintained at a temperature between 430 and 440 C, ideally 434 C by burners 159, and maintained at level A-A in FIG. 8 when the reactor is "at rest".

In FIG. 7 the baffle 157 can be seen which has a lower annular stepped region 157a at its outer radial extent and second stepped region 157c of lesser depth at its inner radial extent. Each lower region has ports 161 consisting of tubes 162 that extend nearly to the bottom of the heated reservoir. The tubes 162, being open at each end provide for the movement of molten alloy between the heated reservoir 155 and the floor of the lower stepped regions 157a and 157c.

Referring to FIG. 8, the apparatus of the embodiment has a thermally insulated top 163 which can be selectively lowered to meet the baffle at the lower stepped region 157a, to sealingly enclose the reaction chamber 153. The nature and working of the seal between the top 163 and the lower stepped region will be described in the following text. Within the reaction chamber 153 and located at an upper level near the top centre of the thermally insulated top 163 are outlets for reaction products, as will also be described in the description which follows. Located in the upper level of the reaction chamber 153 is a rotating paddle 165, driven from above by a rotary actuator through a telescoping drive shaft 166, connected through the top 163 by a sealed coupling 167. The rotating paddle 165 disperses solid reaction products such as sulphides and oxides of zinc as they are formed in the reaction chamber 153 and float to the upper surface of the molten zinc alloy. The compounds of zinc are dispersed in a powdered alkaline earth oxide preferably calcium oxide. At the start of the reaction step, a metered quantity of the calcium oxide dispersant is pneumatically conveyed to the top of the reaction chamber in the form of a fluidised suspension through port 169.

The rotating paddle 165 consists of four radial vanes, and provides for the lower edge 170 of each vane to be is submerged by up to 5 mm in the molten alloy which is maintained at level B during the decomposition step. While four radial vanes are utilised in the embodiment, in alternative arrangements, from three to eight such vanes would prove effective.

FIG. 9 is a cross sectional view of the paddle 165 and vane 170 at section XX showing an elongated slot which is pneumatically connected to a manifold at the junction with the residue transfer port 171. During the decomposition step, condensable hydrocarbons are extracted through port 173 while recirculating non-condensible hydrocarbon gas is supplied through the residue transfer port 171 and is reticulated to each vane, emerging at outlet 175. The flow of gas prevents entry of volatile products into the transfer port and further disperses the zinc compound particles with the dispersant.

At the end of the decompostion step, flow of condensable vapour to port 173 ceases. A suction is applied to the transfer port 171 which communicates with each vane of the paddle to lift and convey the dispersed floating decomposition products from the surface of the molten metal. An equalising flow of non-condensable gas is supplied by port 177 to maintain the required sub-atmospheric pressure in the top of the reaction chamber as additional gas is removed through port 171. The dispersed floating decomposition products are conveyed to a cyclonic separator where they are removed and the hydrocarbon gas is recirculated.

Shown in FIGS. 6 and 8 and located at the upper level B in the reaction chamber 153 is sensor 179 to detect the level of molten alloy and provide feedback to the control system. The control system utilises port 177 to supply non-condensable gas to the reactor to balance suction pressures in port 173 to achieve the desired molten metal levels as process conditions vary during a decomposition cycle.

Located in the reaction chamber 153 attached to the inside of the top 163 above where a tyre will sit at a "lower" level is means to restrain the tyre from floating upwards on submersion, in the form of a perforated screen 181.

Located between the upper level B and the perforated screen 181 is a second perforated screen 183 of a mesh size to allow the passage of volatile fractions and floatation products during the decomposition process and to restrain any remnant dispersed zinc compounds which may lie on the surface of the alloy prior to draining at the end of the decomposition process.

Molten alloy is normally maintained at level A in the lower compartment when the reactor 111 is at rest. Burners 159 heat the reaction vessel to maintain the decomposition temperature in the region 430-440 C. The burner may use stored hydrocarbon gas from the decomposition process, reticulated from a storage vessel 141.

The lower heated reservoir 155 has a port 185 to supply of pressurised gas to the sealed region above the molten alloy surface. The gas is preferably non reactive to zinc and oxygen free to eliminate oxidation products or other compounds forming inside the lower reservoir.

The reaction chamber vessel top 163 can be raised and lowered by a linear actuator 187. The actuator has a telescoping coupling 166 to transfer rotational motion to the paddle within the reaction chamber when it is fully extended.

During the decomposition step, the thermally insulated top 163 is in the lower position where its bottom annular edge 189 is submerged a pool of molten alloy maintained at level A in the lower stepped region 157a of the baffle. The reactor 153 operates in an environment at atmospheric pressure which acts also on the surface of molten metal in the annular space between the outside of the reactor casing 163 and the outer radial extent of the lower stepped region 157a of the heated reservoir 155. To flood the reaction chamber 153 with molten alloy, the control system initiates a sub-atmospheric pressure at port 173, reducing internal pressure and causing molten liquid to rise within the reaction vessel. As liquid rises, the level at A will fall, causing the control system to initiate an increase in the inert gas pressure above the liquid alloy in the reservoir via port 185. The control system applies pressurised gas to port 185 to push molten metal through tubes 162 and ports 161 to the lower stepped regions 157a and 157c of the baffle. The combination of pressurised gas supplied via port 185 and the sub-atmospheric pressure at port 173 dispaces molten metal from within the heated reservoir 155 via tubes 162 and ports 161 up into the reaction chamber 153 to reach level B, while maintaining the liquid at level A in the lower stepped region 157a, outside the thermally insulated top 163.

The control system maintains a sub-atmospheric pressure in the reaction vessel at a sufficient level to provide for molten alloy to rise to level B. The rate of change of pressures in the upper and lower chambers controls the speed of filling and draining in the reaction vessel.

As the liquid level in the reaction chamber rises, the tyre initially floats and continues to rise until it contacts the lower screen 181 and becomes totally immersed. Liquid level rises past the upper perforated screen 183 and carries upwards any residual zinc compounds or dispersant from the previous cycle.

As the liquid level rises above the upper screen, a metered quantity of powdered alkaline earth oxide is expelled from port 169 and is distributed by the rotating paddle over the surface of the molten alloy to a depth of between 3 mm and 10 mm. Recirculating non-condensable hydrocarbon gas is continuously expelled from port 175 to fluidise and distribute the oxide dispersant as the paddle wheel rotates. The mixing of dispersant with the zinc compounds as they float to the surface is preferable to prevent inclusion and agglomoration of metal with the zinc compounds.

The control system monitors the temperatures of the system and reduces the intensity of heating during the decomposition cycle while most of the alloy is in the upper chamber.

The volatile hydrocarbon components in rubber rapidly decompose at a temperature of from 430 C to 435 C within molten alloy due to excellent heat transfer. A typical passenger tyre requires 4 to 10 minutes immersion to be decomposed. The time may be varied according to the product requirements. Because the steel belts are located close to the inner region of tyres, partial decomposition is sufficient to enable the tyre to crumble and release the steel. Once the carbon residue is in bulk form, post processing thermal treatment may be efficiently used to fully extract residual volatiles.

At the end of the decomposition step, floating reaction products are removed from the surface of the molten alloy by suction distributed through entry ports 175 in the rotating paddle pneumatically connected to port 171. Port 177 supplies non-condensable hydrocarbon gas to flush out residual vapours in the condenser pipeline 173. The control system adjusts pressures in the reaction chamber and reservoir such that molten metal drains at a controlled rate into the heated reservoir 155.

Figure 10:
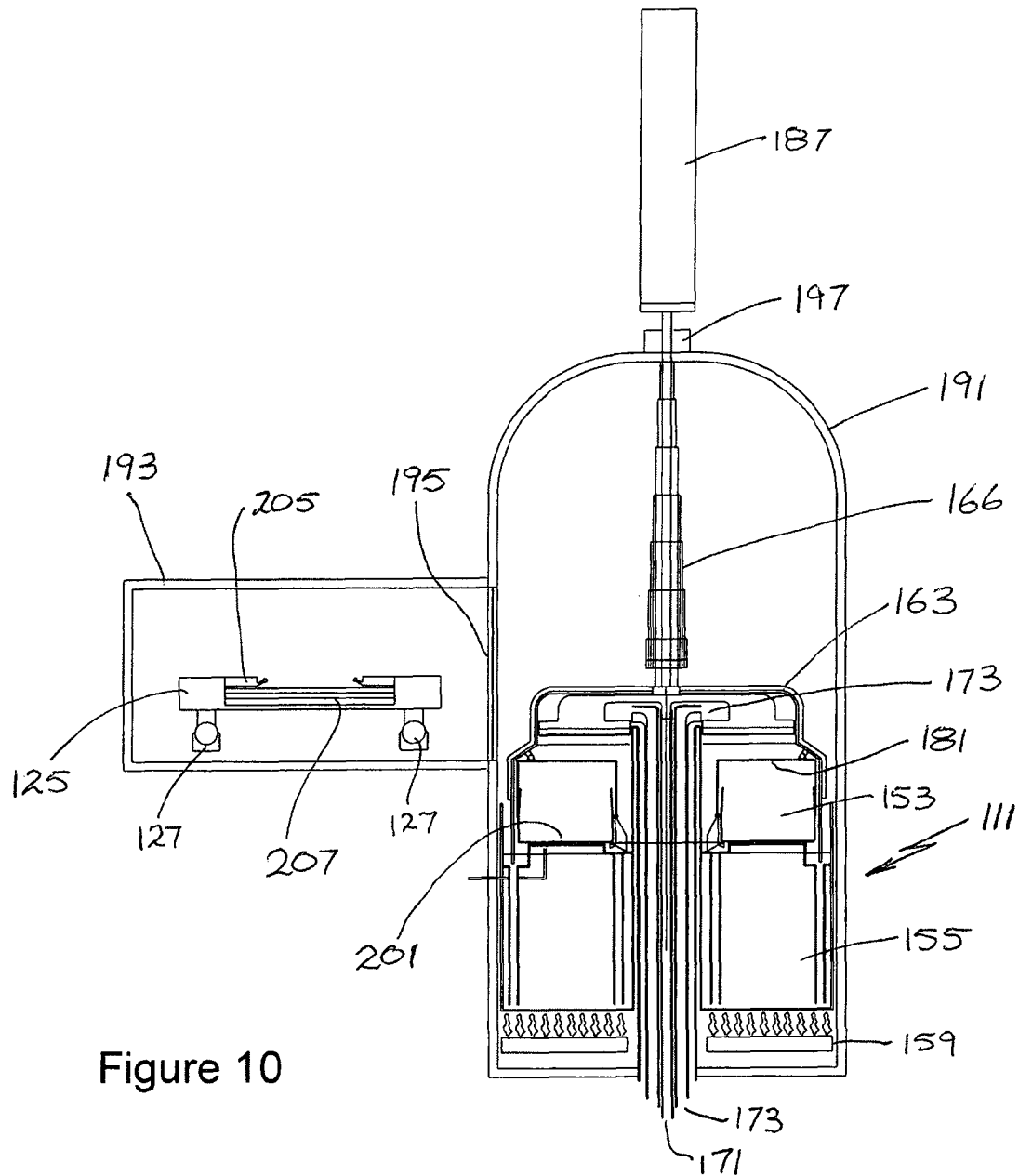
FIG. 10 is a cross section view of the apparatus of the second embodiment showing associated materials handling devices.

FIG. 10 is a cross section representation of a reactor and material transport system of the invention. The reactor 111 is operated within a sealed thermally insulated containment vessel 191. The containment vessel is connected to a material transfer duct 193 by a doorway 195 that opens to provide a passage for the tyre and its supporting basket to pass into the centre of the containment vessel. Within the duct 193 is a shuttle 125 that translates on rails 127 and carries the tyre on perforated tray 201. The shuttle has a transverse acting telescoping actuator 207 to move the perforated tray 201 into the containment vessel. The telescoping actuator can selectively extend and retract a release mechanism 205 to dis-engage the lower tray 201 from the upper screen 181.

A linear actuator 187 provides vertical positioning of the top of the reaction chamber 163. A rotary actuator 197 is telescopically coupled to the paddle wheel within the interior of the reaction chamber to provide a variable rotation of between 5 rpm and 30 rpm to the paddle wheel. The condensable vapours are removed from below the reactor through port 173 and the zinc flotation products exit through port 171.

Referring back to FIG. 8, the upper perforated screen 181 has inner and outer perforated circumferential side panels 198. The inner side panels 198 of the upper section have between 3 and 6 pivoting arms 199 that hang vertically. A lower tray 201 having inner and outer circumferential side panels 202 provides a tray for containing a tyre to undergo decomposition. The inner and outer circumferential side panels 202 do not extend in parallel coaxial arrangement, but rather the inner circumferential side panel deflects towards the outer circumferential side panel, so that they may pass without interference with the inner and outer perforated circumferential side panels 198 of the upper perforated screen 181, when the upper perforated screen 181 and the lower tray 201 are brought together. When the upper perforated screen 181 and the lower tray 201 containing a tyre, are brought together, the pivoting arms deflect radially inwardly as they pass over the inner circumferential side panels 202 of the perforated tray 201. The arms 199 pivot at hinge points 203 to clamp a latching pin 204 over the base of the perforated tray 201 when the required degree of engagement occurs. The upper perforated screen 181 with its side panels 198 forms an enclosed cage with a lower perforated tray 201 and its conical walls 202. The forming of an enclosed cage in this manner means that the invention is not limited to processing tyres, and indeed any polymer waste, either whole or in pieces which may be constrained by the enclosed cage, may be processed in the reactor 153. The two sections remain coupled until the arms are dis-engaged by means of a release mechanism 205 on the transverse actuator 125.

The screen located at the upper level of both embodiments, and the means for restraining the product at a lower level are made of a sheet of non-wetting corrosion-resistant super alloy, as is known in the handling of molten zinc. The screen located at the upper level has 1 to 2 mm circular apertures at a 2 to 3 mm spacing, while the means for restraining the product at a lower level (including the upper perforated screen 181 and the lower tray 201 and their perforated side panels) have 3 mm to 5 mm circular apertures at a 5 mm to 7 mm spacing.

A complete cycle to process a tyre is illustrated in FIGS. 11 to 19.

FIG. 11 illustrates a waste tyre siting in a perforated tray 201 ready to enter the reactor vessel. The thermally insulated top 163 bottom annular edge 189 of the reaction chamber is at its upper level 'H1'. The door 195 of the containment vessel 191 is closed. The molten alloy is at level A in the reservoir 155. The linear actuator 187 is at its upper most vertical limit.

FIG. 12 shows the telescoping transverse actuator 207 on the shuttle transport device has extended to hold the perforated tray 201 containing the waste tyre centrally within the containment vessel 191. The access door 195 is open to allow passage of the perforated tray 201.

In FIG. 13 the bottom annular edge 189 of the thermally insulated top 163 has been lowered to an intermediate position 'H2' by the linear actuator 187. As the thermally insulated top 163 is lowered, the upper screen 181 engages concentrically with the lower tray 201 causing each of the pivoting arms 199 to be deflected by the upper region of the lower tray and finally engaging the latching pins 204 to restrain the lower tray 201.

FIG. 14 shows the thermally insulated top 163 slightly raised by the actuator 187 to bring the bottom annular edge 189 to an upper intermediate level 'H3', to allow the telescoping transverse actuator 207 to be withdrawn. The door 195 to the containment vessel 191 is now closed.

FIG. 15 is the decomposition step in which the waste is submerged in the molten alloy for a period of typically 4-10 minutes. The actuator 187 has lowered the bottom annular edge 189 of the thermally insulated top 163 to its lower limit 'H3'. Sub-atmospheric pressure in the reactor chamber 153 has been reduced whereby drawing molten alloy from the heated reservoir 155 to a level B in the reactor chamber and lowering the level of alloy to a position C in the heated reservoir. A measured quantity of alkaline earth dispersant is released from port 169 to float on the top of the alloy and be dispersed by the paddle 165 with the zinc reaction compounds as they form during the decomposition. The tyre is completely submerged in molten alloy and decomposes, releasing condensable vapour that is ducted to a condenser system via port 173. At the end of decomposition, floating residues that have floated to the surface of the alloy and mixed with calcium oxide dispersant at the top of the reaction chamber are extracted via port 171.

FIG. 16 shows the stage following the end of decomposition when the molten alloy has drained to the lower reservoir 155 and the bottom annular edge 189 of the thermally insulated top 163 has been raised to the upper intermediate position 'H3'. The containment vessel door 195 is open and the telescoping transverse actuator 207 is positioned below the perforated tray 201 containing the solid decomposition products. Selectively extendible release arms 205 are extended in preparation for releasing the tray 201 from the upper screen 181.

In FIG. 17 the thermally insulated top 163 has been moved by actuator 187 to align its bottom annular edge 189 to lower intermediate position 'H2'. The extendible release arms 205 disengage the latching pins 204 and release the lower tray 201 from the upper screen 181.

FIG. 18 shows the bottom annular edge 189 of the thermally insulated top 163 at its upper intermediate position 'H3' providing the required vertical space for the telescoping transverse actuator 207 to withdraw the tray 201 and its contents of decomposed tyre.

FIG. 19 shows the decomposed products in the tray 201 on the shuttle 125 ready to be taken along the linear guide rails 127 to the product discharge hopper. The containment door 195 is closed for a duration of time as the shuttle 125 transports the decomposition products to the product discharge hopper and returns with the next tyre for the cycle to be repeated.

It has been discovered that because the tyre is static during decomposition, the steel reinforcement wire remains surrounded by carbon while the tyre is immersed in the molten zinc. This means that the steel wire is not contaminated with zinc alloy nor is zinc alloy carried away with the metal when the residues are removed from the reaction chamber. It is observed that this is not the case when shredded tyre pieces are immersed in molten zinc. In this case, the cut ends of the reinforcement wires become coated in alloy. It is therefore preferred that the tires are reacted whole in the process and apparatus of the invention.

As the chemical composition of waste tyres varies between manufacturers and the tyres performance requirements, the hydrocarbon reaction products will vary as well. The pyrolysis oil recovered by this apparatus is required to undergo a fractional distillation to segregate each component according to its boiling point. Techniques used for distillation of petroleum products have direct application to pyrolysis oil. Further processing with zeolites or membrane filtration may be applicable according to the particular characteristics of the desired products.

The use of the method of the invention minimises the sulphur content of the pyrolysis oil, which can otherwise contain thiopenes including dimethylthiopene, diethylthiopene, and t-butylthiopene, all of which would contribute to the offensive odour of tyre pyrolysis oil.

The method also provides for a reduction in the contamination of carbon black by zinc oxide compared with existing art.

One reaction product present in the pyrolysis oil of this invention is limonene, presumably formed from the joining of two isoprene molecules. This hydrocarbon also occurs naturally in the peel of citrus fruits and is extracted therefrom. Limonene is used as an industrial solvent and has further application in a wide range of cleaning, chemical and pest control products.

The apparatus of this invention may be to be adapted to process varying quantities of tyres. The apparatus in its simplest form processes one tyre at a time. A single apparatus with a cycle time of 6 minutes can process 10 tyres per hour or approximately 87,600 per year operating continuously.

As illustrated in FIG. 5, it is expected that a commercially viable processing facility using multiple apparatus operated in parallel could be provided, where the output capacity increases in increments of approximately 2000 kg/day for each additional reactor vessels. There is economy in adding multiple reactors in parallel since products are collected and combined for centralized downstream processing. Waste tyres would be preferably sorted prior to processing according to their diameter. The size of the apparatus would be matched to a set range of tyre sizes for optimum efficiency. In a commercial facility, the feeding and reaction chambers would vary in size to cater for small passenger tyres through to light commercial tyres. Steel belted radial tyres are especially suited for the process and apparatus of this invention, as these tyres are less suited to recycling through shredding and crumbing processes.

The most preferred arrangement of the invention is an embodiment where each apparatus as described herein is built as a transportable module, which would be anticipated to fit in a sea container. Multiple apparatus of this nature, in varying dimensions as required, could be transported to a site where used tyres are stored or collected, so that the tyres can be reacted in situ, and products recovered. On a small scale, apparatus according to the invention could comprise a single unit as described, which could be transported to various locations, set up, and run to recycle tyres, and moved on, when the supply of used tyres are exhausted. Such an arrangement may include the condensation stages within the transportable unit or as a separate transportable unit. Such arrangements may be entirely self powered, with integrated electrical generation powered by internal combustion engine, matched to the power requirements of the mechanical process of the apparatus and fueled by the gas combustable reaction products. Additionally, if the process is operating in remote locations, solar photovoltaics and/or batteries may be employed to provide power for process control such as computers and control circuitry.

The refinement and postprocessing of the reaction products is preferably carried out in a centralised chemical processing plant which receives feedstocks from multiple apparatus according to the invention.

It should be appreciated that the scope of the invention is not limited to the preferred embodiment of the apparatus and process as described herein, and that a person skilled in the art will appreciate the changes that may be made without departing from the spirit and scope of the invention.

The invention claimed is:

1. A process for the decomposition of a polymer containing product which may contain sulphur, and recovery of resources therefrom, said process including steps of a reaction step in which said product is contacted at low oxygen levels with molten metal containing elemental zinc in proportion of 90% by weight or more, recovering volatile fractions evolved during said reaction step, and recovering solids including metallic sulphides formed during said reaction step.

2. A process as claimed in claim 1 wherein the molten metal contains elemental zinc in proportion of about 92% by weight to 99.8% by weight, with the balance being chiefly aluminium.

3. A process as claimed in claim 2 wherein the molten metal contains elemental zinc in proportion of at least about 94.9% by weight and aluminium metal in proportion of up to about 5.1% by weight.

4. A process as claimed in claim 2 wherein the molten metal chiefly contains elemental zinc in proportion of from about 99% by weight to 99.8% by weight and aluminium metal in proportion of from 1% by weight to 0.2% by weight.

5. A process as claimed in claim 1 wherein said reaction step is carried out with said molten metal at a temperature of at least 420° C., to a maximum temperature of 550° C.

6. A process as claimed in claim 5 wherein said reaction step is carried out with said molten metal at a temperature in the range of from about 430° C. to about 440° C.

7. A process as claimed in claim 1, wherein said process is carried out in an apparatus having an atmosphere at sub-atmospheric pressure.

8. A process as claimed in claim 1 wherein said process includes adding a finely divided dispersant of zinc compounds at the surface of the molten metal to assist in dividing solid flotation byproducts, and minimising metal adherence thereto.

9. A process as claimed in claim 8 wherein the dispersant is calcium oxide.

10. Apparatus for the decomposition of a polymer containing product which may contain sulphur, and recovery of resources therefrom, said apparatus having a reaction chamber capable of selectably containing said product, and being filled with molten metal comprised of elemental zinc in a proportion of 90% by weight or more to a predetermined upper level within said reaction chamber at reduced oxygen levels in said reaction chamber to submerge said product in said molten metal, said apparatus restraining said product at a lower level within said reaction chamber, said reaction chamber including a screen with a mesh sized to allow passage of volatile fractions and flotation products during the decomposition process taking place while said product is immersed in said molten metal, and to restrain agglomerated flotation products when the molten metal is drained, said screen being located at an intermediate level located between said upper level and said lower level and spaced therefrom, said reaction chamber having a reaction product outlet located above said upper level.

11. Apparatus as claimed in claim 10 wherein said means to restrain said product comprises a cage to fully enclose said product, to contain it within said reaction chamber and to facilitate the removal and transport of solid residues after the decomposition process is concluded.

12. Apparatus as claimed in claim 10 wherein the mesh of said screen has an aperture size of from about 3 mm across to about 5 mm across.

13. Apparatus as claimed in claim 10 wherein said reaction product outlet includes means for evacuating solid reaction flotation products which form within said reaction chamber.

14. Apparatus as claimed in claim 10 wherein said apparatus includes a dispensing inlet for introducing finely divided particles of a zinc compound dispersant such as calcium oxide, at the surface of the molten metal, within said reaction chamber.

15. Apparatus as claimed in claim 14 wherein said apparatus includes a mixing device to mix the dispersant with solid reaction flotation products as they form.

16. Apparatus as claimed in claim 15 wherein means for evacuating solid reaction flotation products comprises a discharge port which is co-located with said mixing device, to sweep up solid reaction flotation products from the surface of said molten metal.

17. Apparatus as claimed in claim 16 wherein said mixing device comprises a set of rotating vanes, and said discharge port comprises a plurality of discharge inlets, one associated with each vane of said set of rotating vanes.

18. Apparatus as claimed in claim 10 wherein the apparatus has a removable or liftable top of cylindrical configuration to selectively enclose said reaction chamber.

19. Apparatus as claimed in claim 18 wherein said top has an annular lower edge, which when the top encloses said reaction chamber, rests in an annular recess in which is received, in use, a pool of molten metal, to provide a seal from outside atmosphere for said reaction chamber.

20. Apparatus as claimed in claim 10 wherein said apparatus includes a heated reservoir located below said reaction chamber, said heated reservoir provided to contain molten metal, and said apparatus includes fluid control means to controllably admit said molten metal into said reaction chamber and to controllably evacuate said molten metal from said reaction chamber.

* * * * *